United States Patent
Suzuki et al.

(10) Patent No.: US 11,904,300 B2
(45) Date of Patent: Feb. 20, 2024

(54) SILICON CARBIDE POROUS BODY, HONEYCOMB STRUCTURE, ELECTRICALLY HEATED CATALYST, AND METHOD OF MANUFACTURING SILICON CARBIDE POROUS BODY

(71) Applicant: NGK INSULATORS, LTD., Nagoya (JP)

(72) Inventors: Shinji Suzuki, Nagoya (JP); Kyohei Atsuji, Nagoya (JP); Takahiro Tomita, Chita (JP)

(73) Assignee: NGK INSULATORS, LTD., Nagoya (JP)

(*) Notice: Subject to any disclaimer, the term of this patent is extended or adjusted under 35 U.S.C. 154(b) by 0 days.

(21) Appl. No.: 17/649,958

(22) Filed: Feb. 4, 2022

(65) Prior Publication Data

US 2022/0305470 A1     Sep. 29, 2022

(30) Foreign Application Priority Data

Mar. 25, 2021 (JP) ................. 2021-052320

(51) Int. Cl.
*B01J 27/224* (2006.01)
*B01J 35/04* (2006.01)
(Continued)

(52) U.S. Cl.
CPC ........... *B01J 27/224* (2013.01); *B01D 53/94* (2013.01); *B01J 21/08* (2013.01); *B01J 23/755* (2013.01);
(Continued)

(58) Field of Classification Search
CPC ........ B01J 27/224; B01J 21/08; B01J 23/755; B01J 35/04; F01N 3/2026; F01N 3/2828;
(Continued)

(56) References Cited

U.S. PATENT DOCUMENTS 7,648,932 B2 *   1/2010   Weisensel ............. C04B 35/573
                                                              502/263
8,530,030 B2      9/2013   Noguchi et al.
(Continued)

FOREIGN PATENT DOCUMENTS

CN     103415490 A    11/2013
JP     2010-105862 A   5/2010
(Continued)

OTHER PUBLICATIONS

Chinese Office Action dated Feb. 1, 2023 (Application No. 202210174357.6).

*Primary Examiner* — Natasha E Young
(74) *Attorney, Agent, or Firm* — BURR PATENT LAW, PLLC (57) ABSTRACT

A silicon carbide porous body contains β-SiC particles, Si particles, and metal silicide particles. The maximum particle diameter of the β-SIC particles is not smaller than 15 μm. The content of the Si particles is not lower than 10 mass %. The maximum particle diameter of the Si particles is not larger than 40 μm. Further, an oxide coating film having a thickness not smaller than 0.01 μm and not larger than 5 μm is provided on surfaces of the Si particles.

10 Claims, 3 Drawing Sheets

(51) Int. Cl.
*B01J 37/00* (2006.01)
*B01J 37/08* (2006.01)
*B01J 37/12* (2006.01)
*B01J 35/02* (2006.01)
*B01J 23/755* (2006.01)
*B01J 21/08* (2006.01)
*B01J 37/02* (2006.01)
*F01N 3/20* (2006.01)
*F01N 3/28* (2006.01)
*B01D 53/94* (2006.01)
*B28B 3/20* (2006.01)
*B28B 11/24* (2006.01)

(52) U.S. Cl.
CPC ............ *B01J 35/023* (2013.01); *B01J 35/04* (2013.01); *B01J 37/0009* (2013.01); *B01J 37/0221* (2013.01); *B01J 37/08* (2013.01); *B01J 37/12* (2013.01); *F01N 3/2026* (2013.01); *F01N 3/2803* (2013.01); *B01D 2255/9155* (2013.01); *B28B 11/243* (2013.01); *B28B 2003/203* (2013.01)

(58) Field of Classification Search
CPC ..... F01N 3/00; F01N 3/08; F01N 3/10; F01N 3/18; F01N 3/20; F01N 3/2006; F01N 3/2013; F01N 3/24; F01N 3/28; F01N 3/2803; F01N 3/2825; B01D 2255/9155; B01D 53/00; B01D 53/34; B01D 53/92; B01D 53/94; B01D 2255/00; B01D 2255/90; B01D 2255/915; C04B 2111/0081; C04B 2235/402; C04B 2235/421; C04B 2235/428; C04B 35/62807; C04B 38/0006; C04B 35/573; C04B 38/0054; C04B 38/0067; C04B 38/0074; B28B 11/00; B28B 11/24; B28B 11/242; B28B 11/243; B28B 2003/00; B28B 2003/20; B28B 2003/203
USPC ........................................................ 422/174
See application file for complete search history.

(56) References Cited

U.S. PATENT DOCUMENTS

| | | | |
|---|---|---|---|
| 9,339,799 B2 * | 5/2016 | Kikuchi | B01D 46/2425 |
| 2014/0011667 A1 | 1/2014 | Tomita et al. | |
| 2018/0280872 A1 * | 10/2018 | Noro | B01J 35/04 |
| 2019/0292104 A1 * | 9/2019 | Tsuboi | C04B 38/0009 |

FOREIGN PATENT DOCUMENTS

| | | |
|---|---|---|
| JP | 5053981 B2 | 10/2012 |
| JP | 5193804 B2 | 5/2013 |
| JP | 5735428 B2 | 6/2015 |

* cited by examiner

Fig. 5

SILICON CARBIDE POROUS BODY, HONEYCOMB STRUCTURE, ELECTRICALLY HEATED CATALYST, AND METHOD OF MANUFACTURING SILICON CARBIDE POROUS BODY

CROSS REFERENCE TO RELATED APPLICATION

The present application claims the benefit of priority to Japanese Patent Application No. 2021-052320 filed on Mar. 25, 2021, the content of which is incorporated herein by reference in its entirety.

TECHNICAL FIELD

The present invention relates to a silicon carbide porous body and a method of manufacturing the same, a honeycomb structure including the silicon carbide porous body, and an electrically heated catalyst including the honeycomb structure.

BACKGROUND ART

Conventionally, in order to perform a purification treatment of toxic substances such as HC, CO, NOx, or the like contained in exhaust gas discharged from an engine of an automobile or the like, a catalytic converter having a columnar honeycomb structure or the like which supports a catalyst has been used.

Patent Publication No. 5193804 (Document 1), for example, discloses a honeycomb structure which can be used as a diesel exhaust gas purification filter (DPF). The honeycomb structure is formed of a silicon carbide porous body containing 1 mass % to 35 mass % of nickel silicide or zirconium silicide and 0.5 mass % to 10 mass % of alumina ($Al_2O_3$). The porosity of the silicon carbide porous body ranges 38% to 80%, and high gas permeation performance in the DPF is thereby achieved. Further, in the silicon carbide porous body, the shape of at least part of β-SiC which is contained as a main component is a particulate shape having a particle diameter of 10 μm or larger. The strength of the silicon carbide porous body is thereby increased. Patent Publication No. 5053981 (Document 2) discloses a honeycomb structure formed of a silicon carbide porous body containing 0.1% to 10 mass % of boron (B) in terms of boron oxide ($B_2O_3$), instead of alumina used in Document 1.

In the above-described catalytic converter, the temperature of the catalyst needs to rise to an activation temperature in the purification treatment of exhaust gas, but since the temperature of the catalytic converter is low immediately after startup of the engine, or so on, there is a possibility that the exhaust gas purification performance may be reduced. Especially, in a plug-in hybrid electrical vehicle (PHEV) or a hybrid vehicle (HV), since the vehicle runs on motor only, the temperature of the catalyst easily decreases. Then, used is an electrically heated catalyst (EHC) in which a conductive catalytic converter is connected to a pair of electrodes and causes itself to generate heat by energization, to thereby preheat the catalyst.

Patent Publication No. 5735428 (Document 3), for example, proposes a honeycomb structure which can be used for the electrically heated catalyst, and this honeycomb structure contains silicon carbide (SiC) particles as an aggregate and silicon as a binder for binding the silicon carbide particles and has a volume electrical resistance (i.e., volume resistivity) ranging from 1 Ω·cm to 400 Ω·cm.

SUMMARY OF INVENTION

In the honeycomb structure disclosed in Documents 1 and 2, since the particle diameter of the SiC particles is not very large, there is a possibility that a binding portion of SiC particles, serving as a conductive path, may be constricted to be narrow. Further, the honeycomb structure hardly includes any structure forming the conductive path, other than binding of the SiC particles. Therefore, when the honeycomb structure is exposed to a high temperature oxidation atmosphere, the narrow binding portion of the SiC particles is oxidized, to thereby block the conductive path, and there is a possibility that the volume resistivity may be significantly increased. For this reason, it is difficult to divert the honeycomb structure to the electrically heated catalyst. Further, in recent years, for the honeycomb structure to be used for the electrically heated catalyst, like the honeycomb structure shown in Document 3, further reduction in the volume resistivity is required.

The present invention is intended for a silicon carbide porous body, and it is an object of the present invention to provide a silicon carbide porous body having high oxidation resistance.

The silicon carbide porous body according to one preferred embodiment of the present invention contains β-SiC particles, Si particles, and metal silicide particles. The maximum particle diameter of the β-SiC particles is not smaller than 15 μm. The content of the Si particles is not lower than 10 mass %. The maximum particle diameter of the Si particles is not larger than 40 μm. An oxide coating film having a thickness not smaller than 0.01 μm and not larger than 5 μm is provided on surfaces of the Si particles.

According to the present invention, it is possible to provide a silicon carbide porous body having high oxidation resistance.

Preferably, the content of the metal silicide particles is not lower than 5 mass %, and the maximum particle diameter of the metal silicide particles is not larger than 20 μm.

Preferably, the silicon carbide porous body further contains one or more kinds of Al and B.

Preferably, the metal silicide particles are nickel silicide.

Preferably, the volume resistivity of the silicon carbide porous body at a room temperature is not lower than 0.01 Ω·cm and lower than 1.0 Ω·cm.

Preferably, the change rate of the volume resistivity thereof after exposing the silicon carbide porous body to an atmosphere at 950° C. for 50 hours is not higher than 100%.

The present invention is also intended for a honeycomb structure. The honeycomb structure according to one preferred embodiment of the present invention includes a cylindrical outer wall and a partition wall partitioning the inside of the cylindrical outer wall into a plurality of cells. The cylindrical outer wall and the partition wall are formed, including the above-described silicon carbide porous body.

The present invention is still also intended for an electrically heated catalyst used for performing a purification treatment of exhaust gas discharged from an engine. The electrically heated catalyst according to one preferred embodiment of the present invention includes the above-described honeycomb structure and a pair of electrode parts fixed to an outer surface of the honeycomb structure, for giving a current to the honeycomb structure.

The present invention is yet also intended for a method of manufacturing a silicon carbide porous body. The method of manufacturing a silicon carbide porous body according to one preferred embodiment of the present invention includes obtaining a sintered body by molding and sintering raw material powder containing raw material metals such as Si, C, and metal silicide and obtaining a silicon carbide porous body by performing an oxidation treatment on the sintered body. The silicon carbide porous body contains β-SiC particles, Si particles, and metal silicide particles. The maximum particle diameter of the β-SiC particles is not smaller than 15 μm. The content of the Si particles is not lower than 10 mass %. The maximum particle diameter of the Si particles is not larger than 40 μm. An oxide coating film having a thickness not smaller than 0.01 μm and not larger than 5 μm is provided on surfaces of the Si particles.

Preferably, the raw material metal is Ni and the average particle diameter of the raw material metal is not larger than 5 μm.

These and other objects, features, aspects and advantages of the present invention will become more apparent from the following detailed description of the present invention when taken in conjunction with the accompanying drawings.

DESCRIPTION OF EMBODIMENTS

Figure 1:
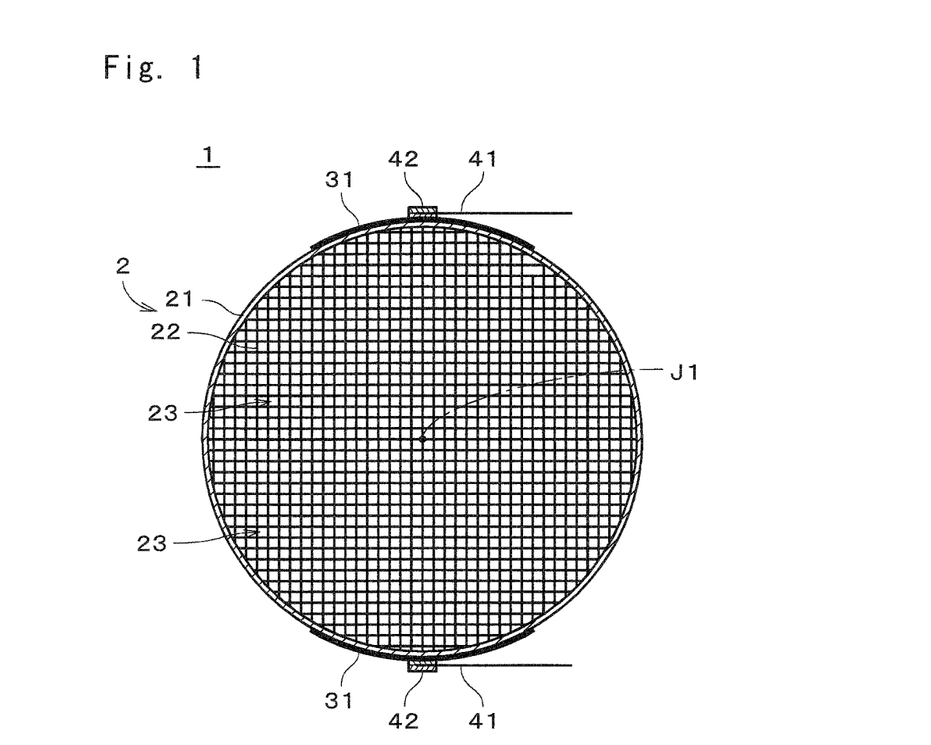
FIG. 1 is a cross section showing an electrically heated catalyst in accordance with one preferred embodiment.

FIG. 1 is a cross section showing an electrically heated catalyst (EHC) 1 in accordance with one preferred embodiment of the present invention. The electrically heated catalyst 1 is a columnar member which is long in one direction, and FIG. 1 shows a cross section perpendicular to a longitudinal direction of the electrically heated catalyst 1. The electrically heated catalyst 1 is used to perform a purification treatment of exhaust gas discharged from an engine of an automobile or the like.

The electrically heated catalyst 1 includes a honeycomb structure 2, a pair of electrode layers 31, and a pair of electrode parts 41. The honeycomb structure 2, the pair of electrode layers 31, and the pair of electrode parts 41 are each conductive. The honeycomb structure 2 is a substantially columnar member having a honeycomb construction, and is a carrier supporting a catalyst in the electrically heated catalyst 1. The pair of electrode layers 31 are fixed on an outer surface of the honeycomb structure 2. The pair of electrode layers 31 are foil-like or plate-like members which are arranged, facing each other with a central axis J1 sandwiched therebetween. The central axis J1 extends in a longitudinal direction of the honeycomb structure 2. Each of the electrode layers 31 is provided along the outer surface of the honeycomb structure 2.

The pair of electrode parts 41 are fixed on a surface of the pair of electrode layers 31 by using a junction part 42. In other words, the pair of electrode parts 41 are indirectly fixed on the outer surface of the honeycomb structure 2 with the pair of electrode layers 31 interposed therebetween. The electrode part 41 is, for example, a substantially strip-like member. The electrode part 41 is part of an electrode terminal for supplying electric power to the honeycomb structure 2. The electrode part 41 is connected to a not-shown power supply. When the power supply applies a voltage across the pair of electrode layers 31 through the electrode part 41, a current flows in the honeycomb structure 2 and the honeycomb structure 2 generates heat by the Joule heat. The catalyst supported by the honeycomb structure 2 is thereby preheated. The voltage applied to the electrically heated catalyst 1 ranges, for example, from 12 V to 900 V, and preferably ranges from 64 V to 600 V. Further, the voltage may be changed as appropriate.

The honeycomb structure 2 is a cell structure which is partitioned into a plurality of cells 23 inside. The honeycomb structure 2 includes a cylindrical outer wall 21 and a partition wall 22. The cylindrical outer wall 21 is a cylindrical portion extending in the longitudinal direction (i.e., the direction perpendicular to this paper of FIG. 1). A cross-sectional shape of the cylindrical outer wall 21 which is perpendicular to the longitudinal direction is substantially circular. The cross-sectional shape may be any other shape such as an elliptical shape, a polygonal shape, or the like.

The partition wall 22 is provided inside the cylindrical outer wall 21 and is a lattice member partitioning the inside thereof into the plurality of cells 23. Each of the plurality of cells 23 is a space extending over substantially the full length of the honeycomb structure 2 in the longitudinal direction. Each cell 23 is a flow passage in which the exhaust gas flows, and the catalyst used for the purification treatment of the exhaust gas is supported by the partition wall 22. A cross-sectional shape of each cell 23 which is perpendicular to the longitudinal direction is, for example, a substantial rectangle. The cross-sectional shape may be any other shape such as a polygonal shape, a circular shape, or the like. In terms of reduction in the pressure loss in the flow of the exhaust gas in the cell 23, it is preferable that the cross-sectional shape should be a quadrangle or a hexagon. Further, in terms of an increase in the structural strength and the uniformity of heating in the honeycomb structure 2, it is preferable that the cross-sectional shape should be a rectangle. The plurality of cells 23 have the same cross-sectional shape in principle. The plurality of cells 23 may include some cells 23 each having a different cross-sectional shape.

The length of the cylindrical outer wall 21 in the longitudinal direction is, for example, 30 mm to 200 mm. The outer diameter of the cylindrical outer wall 21 is, for example, 25 mm to 120 mm. In terms of an increase in the heat resistance of the honeycomb structure 2, the area of a bottom surface of the honeycomb structure 2 (i.e., the area of a region surrounded by the cylindrical outer wall 21 in the bottom surface of the honeycomb structure 2) is preferably 2000 mm² to 20000 mm², and further preferably 5000 mm² to 15000 mm². In terms of prevention of outflow of a fluid flowing in the cell 23, an increase in the strength of the honeycomb structure 2, and the strength balance between the cylindrical outer wall 21 and the partition wall 22, the thickness of the cylindrical outer wall 21 is, for example, 0.1 mm to 1.0 mm, preferably 0.15 mm to 0.7 mm, and more preferably 0.2 mm to 0.5 mm.

The length of the partition wall 22 in the longitudinal direction is substantially the same as that of the cylindrical outer wall 21. In terms of an increase in the strength of the honeycomb structure 2 and reduction in the pressure loss in the flow of the exhaust gas in the cell 23, the thickness of the partition wall 22 is, for example, 0.1 mm to 0.3 mm and preferably 0.15 mm to 0.25 mm.

In terms of an increase in the area of the partition wall 22 which supports the catalyst and reduction in the pressure loss in the flow of the exhaust gas in the cell 23, the cell density of the honeycomb structure 2 (i.e., the number of cells 23 per unit area in the cross section perpendicular to the longitudinal direction) is, for example, 40 cells/cm$^2$ to 150 cells/cm$^2$, and preferably 70 cells/cm$^2$ to 100 cells/cm$^2$. The cell density can be obtained by dividing the number of all cells in the honeycomb structure 2 by the area of a region inside an inner peripheral edge of the cylindrical outer wall 21 in the bottom surface of the honeycomb structure 2. The size of the cell 23, the number of cells 23, the cell density, and the like may be changed in various manners.

The cylindrical outer wall 21 and the partition wall 22 in the honeycomb structure 2 are formed, including the silicon carbide porous body described below. In the present preferred embodiment, the cylindrical outer wall 21 and the partition wall 22 are formed of substantially only the silicon carbide porous body.

The silicon carbide porous body is porous ceramics whose main component is silicon carbide (SiC). The silicon carbide porous body is a composite sintered body containing β-SiC particles, Si particles (i.e., silicon particles), and metal silicide particles. The β-SiC particles serve as an aggregate of the silicon carbide porous body. The Si particles serve as a binder (i.e., a matrix) for binding β-SiC particles. In the silicon carbide porous body, it is preferable that the plurality of β-SiC particles should be so bound by the Si particles as to form a pore among the β-SiC particles.

The content of the β-SiC particles in the silicon carbide porous body is, for example, not lower than 30 mass %, and preferably not lower than 50 mass %. Further, the content of the β-SiC particles is, for example, not higher than 90 mass %, and preferably not higher than 70 mass %.

In the silicon carbide porous body, the maximum particle diameter of the β-SiC particles is not smaller than 15 μm, and preferably not smaller than 20 μm. Thus, by increasing the maximum particle diameter of the β-SiC particles (i.e., coarsening the β-SiC particles), a binding portion of the β-SiC particles, which forms a conductive path, becomes thick. Therefore, the volume resistivity of the silicon carbide porous body is reduced. Further, even when the binding portion of the β-SiC particles is oxidized, blocking of the conductive path becomes hard to occur. Therefore, even when the silicon carbide porous body is exposed to the high temperature oxidation atmosphere, a change in the volume resistivity of the silicon carbide porous body is suppressed. In other word, the oxidation resistance of the silicon carbide porous body is increased. Furthermore, the upper limit of the maximum particle diameter of the β-SiC particles is not particularly limited, but as a practical range, the upper limit thereof is, for example, 120 μm or smaller.

The maximum particle diameter of the β-SiC particles have a value obtained by the following method. First, an arbitrary cross section of the silicon carbide porous body is observed by an electron microscope at an arbitrary magnification (for example, 500 times) and the biggest particle within the field of view (i.e., a particle having the largest area within the field of view) is extracted. Subsequently, the long and short diameters of the biggest particle are obtained. Specifically, two points on the outer circumference of the biggest particle are connected and the longest diameter passing the barycenter is obtained as the long diameter. Further, two points on the outer circumference of the biggest particle are connected and the shortest diameter passing the barycenter is obtained as the short diameter. For the measurement of the long and short diameters, for example, the image analysis software "Image Pro 9" of Media Cybernetics, Inc. can be used. Then, the arithmetic average of the long and short diameters is obtained as the particle diameter of the biggest particle. Next, the position of the field of view in the above-described cross section of the silicon carbide porous body is changed and the particle diameter of the biggest particle is obtained by the same method as above. Then, the particle diameter of the biggest particle is obtained in each of a predetermined number (2 or more, for example, 20) of fields of view on the above-described cross section of the silicon carbide porous body, and the arithmetic average of the respective particle diameters of the predetermined number of biggest particles is obtained as the maximum particle diameter of the β-SiC particles.

The content of the Si particles in the silicon carbide porous body is not lower than 10 mass %, and preferably not lower than 12 mass %. Further, the content of the Si particles is, for example, not higher than 70 mass %, and preferably not higher than 50 mass %. The maximum particle diameter of the Si particles in the silicon carbide porous body is, for example, not smaller than 5 μm, and preferably not smaller than 10 μm. Further, the maximum particle diameter of the Si particles is not larger than 40 μm, and preferably not larger than 20 μm. The maximum particle diameter of the Si particles can be obtained in the same method as the above-described maximum particle diameter of the β-SiC particles is obtained.

When the content of the Si particles is made not lower than 10 mass % and the maximum particle diameter of the Si particles is made not larger than 40 μm, the uniformity of distribution of the Si particles in the silicon carbide porous body is increased, and the conductive path for connecting the β-SiC particles is formed by the Si particles which are distributed almost uniformly. The volume resistivity of the silicon carbide porous body is thereby further reduced. Further, even in the case where the silicon carbide porous body is exposed to the high temperature oxidation atmosphere, blocking of the conductive path due to oxidation is suppressed, and the change in the volume resistivity of the silicon carbide porous body is further suppressed. In other words, the oxidation resistance of the silicon carbide porous body is further increased.

In the silicon carbide porous body, the oxide coating film is formed on the surfaces of the Si particles. The thickness of the oxide coating film is not smaller than 0.01 μm and not larger than 5 μm. Even in the case where the silicon carbide porous body is exposed to the high temperature oxidation atmosphere, oxidation of the Si particles is thereby suppressed and the change in the volume resistivity of the silicon carbide porous body is further suppressed. In other words, the oxidation resistance of the silicon carbide porous body is further increased. The thickness of the above-described oxide coating film is preferably not smaller than 0.05 μm. Further, the thickness of the oxide coating film is preferably not larger than 1.0 μm.

The thickness of the oxide coating film have a value obtained by the following method. First, an arbitrary cross section including the oxide coating film in the silicon carbide porous body is observed by an electron microscope at an arbitrary magnification (for example, 10000 times) and the largest thickness of the oxide coating film within the field of view is obtained. Next, the position of the field of view in the above-described cross section of the silicon carbide porous body is changed and the largest thickness of the oxide coating film is obtained by the same method as above. Then, the largest thickness of the oxide coating film is obtained in each of a predetermined number (2 or more, for example, 20) of fields of view on the above-described cross section of the silicon carbide porous body, and the arithmetic average of the predetermined number of largest thicknesses is obtained as the thickness of the oxide coating film.

The above-described oxide coating film partially or entirely coats the Si particles. The oxide coating film contains, for example, silicon dioxide ($SiO_2$). The $SiO_2$ is generated by oxidizing the surfaces of the Si particles in the later-described manufacture of the silicon carbide porous body. The oxide coating film may contain any oxide other than $SiO_2$. Further, the oxide coating film may contain no $SiO_2$ and be formed of an oxide other than $SiO_2$.

The content of the metal silicide particles in the silicon carbide porous body is, for example, not lower than 5 mass %, and preferably not lower than 10 mass %. Further, the content of the metal silicide particles is, for example, not higher than 30 mass %, and preferably not higher than 20 mass %. The maximum particle diameter of the metal silicide particles in the silicon carbide porous body is, for example, not smaller than 5 μm, and preferably not smaller than 10 μm. Further, the maximum particle diameter of the metal silicide particles is, for example, not larger than 20 μm, and preferably not larger than 15 μm. The maximum particle diameter of the metal silicide particles can be obtained in the same method as the above-described maximum particle diameter of the β-SiC particles is obtained.

When the content of the metal silicide particles is made not lower than 5 mass % and the maximum particle diameter of the metal silicide particles is made not larger than 20 μm, the uniformity of distribution of the metal silicide particles in the silicon carbide porous body is increased. As described later, in the manufacture of the silicon carbide porous body by reaction sintering, since metal silicide is distributed almost uniformly, the grain growth (i.e., coarsening) of the β-SiC particles is promoted in almost the whole of the silicon carbide porous body. The binding portion of the β-SiC particles forming the conductive path is further thickened, and the volume resistivity of the silicon carbide porous body is further reduced. Further, even in the case where the silicon carbide porous body is exposed to the high temperature oxidation atmosphere, blocking of the conductive path becomes harder to occur, and the change in the volume resistivity of the silicon carbide porous body is further suppressed. In other words, the oxidation resistance of the silicon carbide porous body is further increased.

Since the silicon carbide porous body contains the metal silicide particles, the thermal conductivity is also increased. Further, when the content of the metal silicide particles is made not higher than 20 mass %, the thermal expansion coefficient of the silicon carbide porous body is reduced and the thermal shock resistance is increased. Further, the above-described oxide coating film may be formed on surfaces of the metal silicide particles. For this reason, even in the case where the silicon carbide porous body is exposed to the high temperature oxidation atmosphere, oxidation of the metal silicide particles is suppressed.

The above-described metal silicide particles are preferably nickel silicide. In the manufacture of the silicon carbide porous body described later, since the raw material contains nickel (Ni), the melting point of Si decreases and the grain growth (i.e., coarsening) of the β-SiC particles is further promoted. The binding portion of the β-SiC particles forming the conductive path thereby becomes further thicker, and the volume resistivity of the silicon carbide porous body is further reduced. Further, even in the case where the silicon carbide porous body is exposed to the high temperature oxidation atmosphere, blocking of the conductive path becomes harder to occur, and the change in the volume resistivity of the silicon carbide porous body is further suppressed. In other words, the oxidation resistance of the silicon carbide porous body is further increased.

In the present preferred embodiment, the above-described metal silicide particles are nickel disilicide ($NiSi_2$). The heat resistance of the silicon carbide porous body is thereby increased. Further, the metal silicide particles may contain nickel silicide (for example, $Ni_3Si$, $Ni_5Si_2$, $Ni_2Si$, NiSi) other than $NiSi_2$, additionally to $NiSi_2$. Alternatively, the metal silicide particles may not contain $NiSi_2$ but may contain nickel silicide other than $NiSi_2$. The metal silicide particles may contain metal silicide (for example, zirconium silicide, iron silicide, titanium silicide, tungsten silicide, or the like) other than nickel silicide, additionally to nickel silicide. More alternatively, the metal silicide particles may not contain nickel silicide but may contain metal silicide other than nickel silicide.

The silicon carbide porous body may contain one or more kinds of aluminum (Al) and boron (B). Al and/or B are/is added as the aid in the manufacture of the silicon carbide porous body described later. In the manufacture of the silicon carbide porous body, since the raw material contains Al and/or B, the grain growth (i.e., coarsening) of the β-SiC particles is promoted. The binding portion of the β-SiC particles forming the conductive path thereby becomes thicker, and the volume resistivity of the silicon carbide porous body is reduced. Further, even in the case where the silicon carbide porous body is exposed to the high temperature oxidation atmosphere, blocking of the conductive path becomes harder to occur, and the change in the volume resistivity of the silicon carbide porous body is suppressed. In other words, the oxidation resistance of the silicon carbide porous body is increased.

In the case where Al is contained in the silicon carbide porous body, Al has only to be contained as an element, and the state of Al contained in the silicon carbide porous body does not matter. Al may be contained in the silicon carbide porous body, for example, as aluminum oxide ($Al_2O_3$). Similarly, in the case where B is contained in the silicon carbide porous body, B has only to be contained as an element, and the state of B contained in the silicon carbide porous body does not matter. B may be contained in the silicon carbide porous body, for example, as boron oxide ($B_2O_3$).

The identification and the quantity determination of a β-SiC phase, a Si phase, and a metal silicide phase in the silicon carbide porous body are performed by pattern fitting of a result of the powder X-ray diffraction method (XRD) by the WPPD (whole-powder-pattern decomposition) method. For this analysis, for example, software such as "TOPAS" of Bruker Corporation or the like can be used.

The volume resistivity of the silicon carbide porous body at a room temperature is not lower than 0.01 Ω·cm and lower than 1.0 Ω·cm. In the present specification, the "room temperature" indicates 20° C., and the "volume resistivity" refers to volume resistivity at the room temperature, unless otherwise specified. When the volume resistivity of the silicon carbide porous body is made lower than 1.0 Ω·cm, the electrical conductivity of the electrically heated catalyst 1 is increased and a quick rise of the temperature of the electrically heated catalyst 1 is achieved. Further, when the volume resistivity of the silicon carbide porous body is made not lower than 0.01 Ω·cm, even in a case where a relatively high voltage is applied to the silicon carbide porous body, damage of an electric circuit due to excessive current flow is prevented. The volume resistivity of the silicon carbide porous body is preferably not higher than 0.5 Ω·cm. Further, the volume resistivity of the silicon carbide porous body is preferably not lower than 0.1 Ω·cm. The volume resistivity can be measured by the four-terminal method (JIS C2525).

The change rate of the volume resistivity (hereinafter, also referred to as a "resistance change rate") after exposing the silicon carbide porous body to an atmosphere at 950° C., which is a high temperature oxidation atmosphere, for 50 hours is preferably not higher than 100%. The change rate is a result expressed by percentage, which is obtained by subtracting 1 from a value obtained by dividing the volume resistivity of the silicon carbide porous body after the exposing thereof to an atmosphere at 950° C. for 50 hours by the volume resistivity (hereinafter, also referred to as "initial resistivity") of the silicon carbide porous body before the exposure. In the present specification, the "resistance change rate" refers to the change rate of the volume resistivity of the silicon carbide porous body after the exposing thereof to the atmosphere at 950° C. for 50 hours, unless otherwise specified.

When the resistance change rate of the silicon carbide porous body is made not higher than 100%, even in the case where the silicon carbide porous body is exposed to the high temperature oxidation atmosphere, the change in the volume resistivity of the silicon carbide porous body is suitably suppressed. Various performances such as the energization performance and the like of the electrically heated catalyst 1 can be thereby kept within a desirable range. The resistance change rate of the silicon carbide porous body is preferably not higher than 50%. Further, there is a possibility that the volume resistivity of the silicon carbide porous body may be reduced by the effects of the impurities contained in the n-SiC particles and the Si particles, and the like. In this case, the resistance change rate is preferably not lower than −50%, and more preferably not lower than −10%. Since it is desirable that the volume resistivity of the silicon carbide porous body should not be changed, it is desirable that the resistance change rate should be closer to 0%.

The porosity of the silicon carbide porous body is, for example, not lower than 30%, and preferably not lower than 40%. Further, the porosity thereof is, for example, not higher than 70%, and preferably not higher than 65%. When the porosity is made not lower than 30%, it is possible to reduce the Young's modulus of the silicon carbide porous body and increase the thermal shock resistance thereof. Further, when the porosity is made not higher than 70%, the denseness of the silicon carbide porous body is increased. As a result, the volume resistivity of the silicon carbide porous body is reduced and the oxidation resistance and the strength of the silicon carbide porous body are increased. The porosity can be measured, for example, by the mercury press-in method (JIS R1655) using a mercury porosimeter or the like.

The pore diameter of the silicon carbide porous body is, for example, not smaller than 1 μm, and preferably not smaller than 2 μm. Further, the pore diameter thereof is, for example, not larger than 15 μm, and preferably not larger than 10 μm. When the pore diameter is made not smaller than 1 μm, it is possible to prevent the specific surface area of the silicon carbide porous body from becoming excessively large, resulting in a decrease in oxidation resistance. When the pore diameter is made not larger than 15 μm, the denseness of the silicon carbide porous body is increased. As a result, the volume resistivity of the silicon carbide porous body is reduced and the oxidation resistance and the strength of the silicon carbide porous body are increased. In the present specification, the "pore diameter" refers to the average pore diameter of the silicon carbide porous body.

The pore diameter can be measured, for example, by the mercury press-in method (JIS R1655) using the mercury porosimeter or the like.

The bulk density of the silicon carbide porous body is, for example, not lower than 1.0 g/cm$^3$, and preferably not lower than 1.1 g/cm$^3$. Further, the bulk density thereof is, for example, not higher than 1.5 g/cm$^3$, and preferably not higher than 1.3 g/cm$^3$. When the bulk density is made not lower than 1.0 g/cm$^3$, the volume resistivity of the silicon carbide porous body is reduced and the oxidation resistance and the strength of the silicon carbide porous body are increased. Further, when the bulk density is made not higher than 1.5 g/cm$^3$, the heat capacity of the silicon carbide porous body is reduced and the temperature becomes easier to rise. The bulk density can be measured, for example, by the mercury press-in method (JIS R1655) using the mercury porosimeter or the like.

The electrode layer 31 extends in the longitudinal direction along the outer surface of the honeycomb structure 2 and spreads in a circumferential direction around the central axis J1 (hereinafter, also referred to simply as a "circumferential direction"). The electrode layer 31 spreads the current from the electrode part 41 in the longitudinal direction and the circumferential direction, to thereby increase the uniformity of heat generation of the honeycomb structure 2. The length of the electrode layer 31 in the longitudinal direction is, for example, 80% or more of the length of the honeycomb structure 2 in the longitudinal direction, and preferably 90% or more. More preferably, the electrode layer 31 extends over the full length of the honeycomb structure 2.

The angle of the electrode layer 31 in the circumferential direction (i.e., an angle formed by two line segments extending from both ends of the electrode layer 31 in the circumferential direction to the central axis J1) is, for example, not smaller than 30°, preferably not smaller than 40°, and more preferably not smaller than 60°. On the other hand, in terms of suppressing the current flowing inside the honeycomb structure 2 from decreasing due to the pair of electrode layers 31 which are too close to each other, the angle of the electrode layer 31 in the circumferential direction is, for example, not larger than 140°, preferably not larger than 130°, and more preferably not larger than 120°.

In the exemplary case shown in FIG. 1, though the angle between centers of the pair of electrode layers 31 in the circumferential direction (i.e., the angle not larger than 180°, which is formed by two line segments extending from the respective centers of the two electrode layers 31 in the circumferential direction to the central axis J1 in FIG. 1) is 180°, this angle may be changed as appropriate. The angle is, for example, not smaller than 150°. preferably not smaller than 160°, and more preferably not smaller than 170°.

In terms of preventing the electric resistance from becoming excessively high and preventing any breakage in a case where the honeycomb structure 2 is put into a container (i.e., in canning), the thickness of the electrode layer 31 (i.e., the thickness in the radial direction) is, for example, 0.01 mm to 5 mm, and preferably 0.01 mm to 3 mm.

It is preferable that the volume resistivity of the electrode layer 31 should be lower than that of the honeycomb structure 2. The current thereby becomes easier to flow to the electrode layer 31 than to the honeycomb structure 2, and the current becomes easier to be spread in the longitudinal direction and the circumferential direction of the honeycomb structure 2.

The electrode layer 31 is formed of, for example, conductive ceramics, a metal, or a composite material of the conductive ceramics and the metal. The conductive ceramics is, for example, silicon carbide (SiC) or a metal silicide such as tantalum silicide (TaSi$_2$), chromium silicide (CrSi$_2$), or the like. The metal is, for example, chromium (Cr), iron (Fe), cobalt (Co), nickel (N), Si, or titanium (Ti). In terms of reduction in the thermal expansion coefficient, the material of the electrode layer 31 may be a composite material in which alumina, mullite, zirconia, cordierite, silicon nitride, aluminum nitride, or the like is added to one kind of or two or more kinds of metals.

It is preferable that the material of the electrode layer 31 should be a material which can be sintered (fired) at the same time as the honeycomb structure 2 is sintered. In terms of compatibility between the heat resistance and the conductivity, the material of the electrode layer 31 is preferably ceramics whose main component (specifically, containing 90 mass % or more) is SiC or a silicon-silicon carbide (Si—SiC) composite material, and more preferably SiC or a Si—SiC composite material. The Si—SiC composite material contains SiC particles as an aggregate and Si as a binder for binding the SiC particles, and it is preferable that a plurality of SiC particles should be so bound by Si as to form a pore among the SiC particles.

The electrode part 41 is formed of, for example, a simple metal or an alloy. In terms of having high corrosion resistance and appropriate volume resistivity and thermal expansion coefficient, the material of the electrode part 41 is preferably an alloy containing at least one kind of Cr, Fe, Co, Ni, Ti, and aluminum (Al). The electrode part 41 is preferably stainless steel and more preferably contains Al. Further, the electrode part 41 may be formed of a metal-ceramics mixed member. The metal contained in the metal-ceramics mixed member is, for example, a simple metal such as Cr, Fe, Co, Ni, Si, or Ti or an alloy containing at least one kind of metal selected from a group of these metals. The ceramics contained in the metal-ceramics mixed member is, for example, silicon carbide (SiC) or a metal compound such as metal silicide (e.g., tantalum silicide (TaSi$_2$) or chromium silicide (CrSi$_2$)) or the like. As the ceramics, cermet (i.e., a composite material of ceramics and a metal) may be used. The cermet is, for example, a composite material of metallic silicon and silicon carbide, a composite material of metal silicide, metallic silicon, and silicon carbide, or a composite material in which one or more kinds of insulating ceramics such as alumina, mullite, zirconia, cordierite, silicon nitride, aluminum nitride, or the like are added to one or more kinds of the above-described metals.

Each of the junction parts 42 is formed of, for example, a composite material containing a metal and an oxide. The metal is, for example, one or more kinds of stainless steel, a Ni—Fe alloy, and Si. The oxide is one or more kinds of cordierite-based glass, silicon dioxide (SiO$_2$), aluminum oxide (Al$_2$O$_3$), magnesium oxide (MgO), and a composite oxide of these oxides.

The junction part 42 may contain a conductive material other than any metal, instead of the above-described metal or additionally to the above-described metal. The conductive material is, for example, one or more kinds of a boride such as zinc boride, tantalum boride, or the like, a nitride such as titanium nitride, zirconium nitride, or the like, and a carbide such as silicon carbide, tungsten carbide, or the like.

Figure 2:
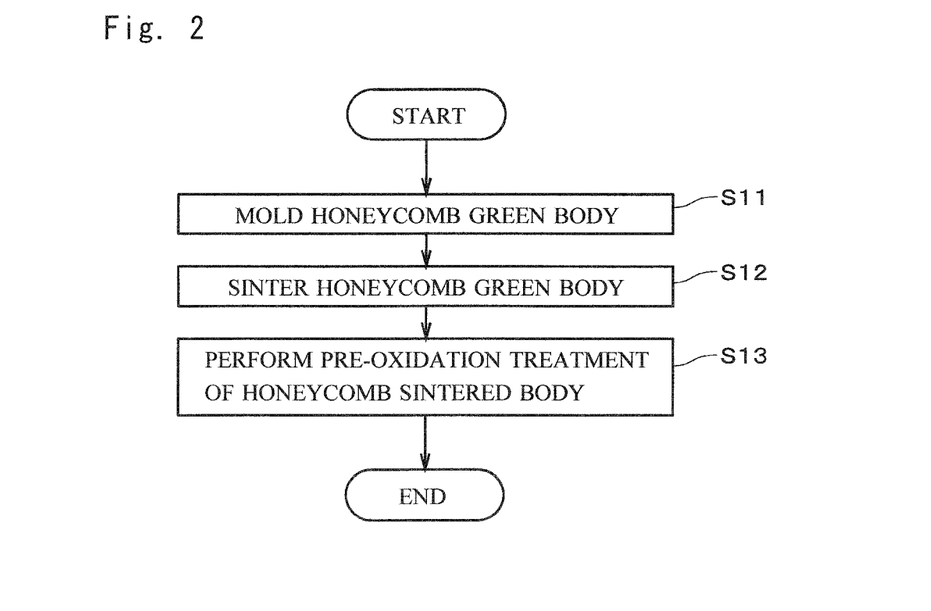
FIG. 2 is a flowchart showing an operation flow for manufacturing a honeycomb structure.

Next, with reference to FIG. 2, an exemplary flow of manufacturing the honeycomb structure 2 will be described. First, raw material powder containing Si, carbon (C), and a raw material metal of metal silicide (Ni in the present preferred embodiment) a binder, a pore-forming material, and the like are weighed to have a predetermined composition and dry-mixed by using a dry mixer, to thereby obtain mixed powder. Further, the mixing of the raw material powder, the binder, and the like may be performed by wet mixing using a solvent (for example, ion exchange water, an organic solvent, or the like). To the above-described raw material powder, an aid may be added, additionally to Si, C, and Ni which are the main raw materials. The aid is, for example, Al and/or B.

As the binder, for example, methyl cellulose, hydroxypropoxyl cellulose, hydroxyethyl cellulose, carboxymethyl cellulose, polyvinyl alcohol, and the like can be used. As the pore-forming material, graphite, flour, starch, phenol resin, polymethylmethacrylate, polyethylene, polyethylene terephthalate, foaming resin (acrylonitrile plastic balloon), water-absorbing resin, and the like can be used.

Subsequently, the above-described mixed powder, an appropriate amount of water, and the like are kneaded by a kneader, and body paste is produced from the kneaded product which is thereby obtained, by a kneading machine. Then, by extrusion-molding the body paste, a green body having a honeycomb construction (hereinafter, also referred to as a "honeycomb green body") is manufactured. (Step S11). Next, microwave drying is performed on the honeycomb green body and then hot-air drying is performed thereon at 100° C. Further, degreasing is performed on the honeycomb green body after the drying, at 200° C. to 1000° C. for 1 to 10 hours in an air atmosphere.

The honeycomb green body after the degreasing is sintered at 1250° C. to 1800° C. (preferably, at 1300° C. to 1750° C.) for 0.5 to 5 hours in an inert gas atmosphere such as an argon (Ar) atmosphere or the like. A sintered body having a honeycomb construction (hereinafter, also referred to as a "honeycomb sintered body") is thereby manufactured. (Step S12).

After that, by performing an oxidation treatment of the honeycomb sintered body, the above-described honeycomb structure 2 is manufactured (Step S13). The oxidation treatment in Step S13 is a preliminary oxidation treatment which is performed before exposing the honeycomb structure 2 to an oxidation atmosphere at the time of use, and is hereinafter also referred to as a "pre-oxidation treatment". The pre-oxidation treatment is performed by, for example, heating the honeycomb sintered body at 900° C. to 1300° C. for 0.5 to 20 hours in the air atmosphere. The pre-oxidation treatment is also referred to as "oxidation aging". By performing the pre-oxidation treatment on the honeycomb sintered body, the oxide coating film such as SiO$_2$ or the like is generated on the surfaces of the Si particles and the surfaces of the Si particles are coated by the oxide coating film. Further, the temperature, the time, the atmosphere, and the like in the pre-oxidation treatment may be changed in various manners. Furthermore, the temperature, the time, the atmosphere, and the like in the above-described drying, degreasing, and sintering of the honeycomb green body may be also changed in various manners.

In the manufacture of the honeycomb structure 2, it is preferable that the average particle diameter of Ni in the above-described raw material powder should be not larger than 5 μm. In the honeycomb green body described above, the uniformity of distribution of Ni is thereby increased. For this reason, in the sintering of the honeycomb green body, the grain growth (i.e., coarsening) of the β-SiC particles is promoted in almost the whole of the honeycomb green body. As a result, the volume resistivity of the silicon carbide porous body is further reduced and the oxidation resistance of the silicon carbide porous body is further increased. In the present specification, unless otherwise specified, the "average particle diameter" of the raw material powder refers to a value obtained by the particle size distribution measurement performed by the laser diffraction scattering method (JIS R1629), which is the average particle diameter based on the volume standard.

The average particle diameter of Si in the above-described raw material powder ranges, for example, from 1 μm to 100 μm, and preferably ranges from 2 μm to 80 μm. Further, the average particle diameter of C in the raw material powder ranges, for example, from 5 nm to 50 μm, and preferably ranges from 10 nm to 30 μm. The average particle diameter of Al in the raw material powder ranges, for example, from 1 μm to 100 μm, and preferably ranges from 3 μm to 50 μm.

The electrically heated catalyst 1 is manufactured by fixing the pair of electrode layers 31 and the pair of electrode parts 41 to the honeycomb structure 2 which is manufactured as described above. In the electrically heated catalyst 1, the catalyst is supported by inner surfaces of the plurality of cells 23 (i.e., a side surface of the partition wall 22) of the honeycomb structure 2. Further, the pair of electrode layers 31 may be formed at the same time as the honeycomb structure 2 is formed, by giving electrode layer paste which is a raw material of the electrode layer 31 to the honeycomb green body which is a precursor of the honeycomb structure 2 and sintering both the honeycomb green body and the electrode layer paste.

Next, with reference to Tables 1 to 3, Examples of the honeycomb structure 2 in accordance with the present invention and Comparative Example for comparison with the honeycomb structure 2 will be described. Table 1 shows respective raw material compositions of the honeycomb structure 2 in Examples and the honeycomb structure in Comparative Example, and Tables 2 and 3 show respective compositions and characteristics of the honeycomb structure 2 in Examples and the honeycomb structure in Comparative Example.

TABLE 1

| | Raw Material Composition | | | | | | | |
|---|---|---|---|---|---|---|---|---|
| | | | | | | Aid | Binder | Pore-Forming Material |
| | Si Content Percentage (Mass %) | C Content Percentage (Mass %) | Ni Content Percentage (Mass %) | Particle Diameter (μm) | Element | Content Percentage (Parts By Mass) | Content Percentage (Parts By Mass) | Content Percentage (Parts By Mass) |
| Example 1 | 70.9 | 21.7 | 7.4 | 0.5 | — | — | 10 | 2 |
| Example 2 | 70.9 | 21.7 | 7.4 | 0.5 | Al | 1 | 10 | 2 |
| Example 3 | 70.9 | 21.7 | 7.4 | 0.5 | Al | 2 | 10 | 2 |
| Example 4 | 70.9 | 21.7 | 7.4 | 0.5 | Al | 5 | 10 | 2 |
| Example 5 | 74.5 | 17.7 | 7.8 | 0.5 | Al | 5 | 10 | 2 |
| Example 6 | 74.5 | 17.7 | 7.8 | 0.5 | — | — | 10 | 2 |
| Example 7 | 70.9 | 21.7 | 7.4 | 0.5 | B | 0.5 | 10 | 2 |
| Comparative Example 1 | 70.9 | 21.7 | 7.4 | 35 | — | — | 10 | 2 |
| Comparative Example 2 | 68.5 | 24.4 | 7.2 | 0.5 | — | — | 10 | 2 |
| Comparative Example 3 | 70.9 | 21.7 | 7.4 | 35 | Al | 1 | 10 | 2 |
| Comparative Example 4 | 70.9 | 21.7 | 7.4 | 0.5 | Al | 5 | 10 | 2 |

TABLE 2

| | Silicon Carbide Porous Body | | | | | | |
|---|---|---|---|---|---|---|---|
| | SiO$_2$ | Si | | β-SiC | | NiSi$_2$ | |
| | Oxide Coating Film (μm) | Content Percentage (Mass %) | Maximum Particle Diameter (μm) | Content Percentage (Mass %) | Maximum Particle Diameter (μm) | Content Percentage (Mass %) | Maximum Particle Diameter (μm) |
| Example 1 | 0.5 | 13 | 10 | 72 | 22 | 13 | 11 |
| Example 2 | 0.4 | 13 | 35 | 70 | 26 | 14 | 15 |
| Example 3 | 0.3 | 13 | 32 | 70 | 28 | 14 | 12 |
| Example 4 | 0.1 | 12 | 30 | 68 | 33 | 14 | 9 |
| Example 5 | 0.05 | 24 | 38 | 56 | 30 | 14 | 15 |
| Example 6 | 0.3 | 26 | 15 | 56 | 17 | 16 | 10 |
| Example 7 | 1.0 | 12 | 35 | 71 | 25 | 14 | 15 |
| Comparative Example 1 | 0.5 | 13 | 50 | 72 | 10 | 13 | 22 |
| Comparative Example 2 | 0.5 | 5 | 5 | 87 | 5 | 7 | 5 |
| Comparative Example 3 | 0.5 | 12 | 35 | 71 | 10 | 14 | 25 |
| Comparative Example 4 | No | 12 | 30 | 68 | 33 | 14 | 10 |

TABLE 3

| | Characteristics | |
|---|---|---|
| | Initial Resistivity (Ω·cm) | Resistance Change Rate (%) |
| Example 1 | 0.10 | 10 |
| Example 2 | 0.15 | 20 |
| Example 3 | 0.12 | 20 |
| Example 4 | 0.20 | 30 |
| Example 5 | 0.08 | 50 |
| Example 6 | 0.12 | 50 |
| Example 7 | 0.52 | 80 |
| Comparative Example 1 | 0.15 | 150 |
| Comparative Example 2 | 0.64 | 440 |
| Comparative Example 3 | 0.05 | 150 |
| Comparative Example 4 | 0.15 | 220 |

As shown in Table 1, in Examples 1 to 7 and Comparative Examples 1 to 4, the composition of Si, C, and Ni which are main raw materials, the average particle diameter of Ni, whether an aid is used or not, the kind of the aid, and the addition amount of the aid are changed. The honeycomb structure 2 shown in Examples 1 to 7 is manufacture by Steps S11 to S13 described above. The sintering temperature and the sintering time of the honeycomb green body in Step S12 are 1430° C. and 2 hours, respectively. The same applies to the honeycomb structure shown in Comparative Example 1.

The respective contents of β-SiC, Si, and NiSi$_2$ in Table 2 are measured by the above-described powder X-ray diffraction method. As the X-ray diffraction apparatus, used is a sealed-tube X-ray diffraction apparatus (D8-ADVANCE manufactured by Bruker AXS). The measurement conditions are CuKα, 40 kV, and 40 mA, and 2θ=10-70°, and the step width is 0.02°. Further, the respective maximum particle diameters of β-SiC, Si, and NiSi$_2$ are obtained by the above-described method. The film thickness of SiO$_2$ is obtained by the above-described method for obtaining the thickness of the oxide coating film.

The initial resistivity in Table 3 is volume resistivity measured by the four-terminal method (JIS C2525). The resistance change rate is obtained by the above-described method. Specifically, a specimen cut out from the partition wall 22 of the honeycomb structure 2 is exposed in the atmosphere at 950° C. for 50 hours, and then the volume resistivity of the specimen (hereinafter, also referred to as "post-exposure resistivity") is measured by the four-terminal method. Then, the resistance change rate refers to a result expressed by percentage, which is obtained by subtracting 1 from a value obtained by dividing the post-exposure resistivity by the initial resistivity. The cross-sectional area in the case where the volume resistivity of the honeycomb structure is measured is corrected by using the aperture ratio.

In Example 1, the contents of Si, C, and Ni which are main raw materials are 70.9 mass %, 21.7 mass %, and 7.4 mass %, respectively, and the average particle diameter of Ni is 0.5 μm. Further, 10 parts by mass of the binder and 2 parts by mass of the pore-forming material are added with respect to 100 parts by mass of the main raw material (i.e., Si, C, and Ni). Further, Al and B serving as the aid are not added.

The constitution of the honeycomb structure 2 in Example 1 includes β-SiC, Si, NiSi$_2$, and. SiO$_2$ which is the oxide coating film. The film thickness SiO$_2$ is 0.5 μm. The content and the maximum particle diameter of Si are 13 mass % and 10 μm, respectively. The content and the maximum particle diameter of β-SiC are 72 mass % and 22 μm, respectively. The content and the maximum particle diameter of NiSi$_2$ are 13 mass % and 11 μm, respectively.

Figure 3:
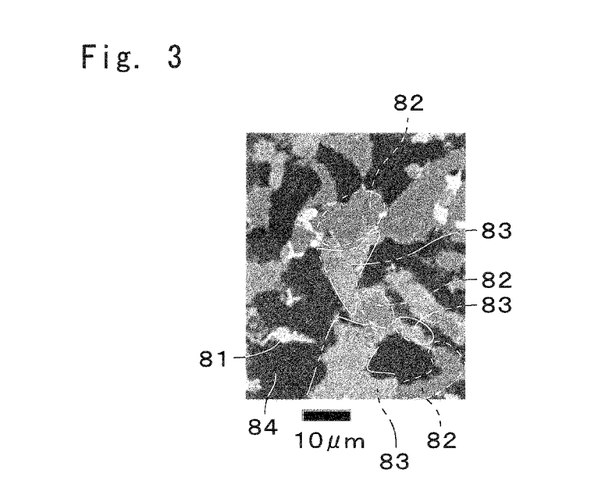
FIG. 3 is a SEM image of a honeycomb structure in one Example.

FIG. 3 is a SEM (Scanning Electron Microscope) image showing a polished cross section of the honeycomb structure 2 in Example 1. In FIG. 3, a white portion 81 represents NiSi$_2$, and a black portion 84 represents a pore. Further, a dark gray portion 82 represents β-SiC and a light gray portion 83 represents Si. In FIG. 3, part of the gray portion 82 representing β-SiC is surrounded by a broken line and the gray portion 83 representing Si is surrounded by a two-dot chain line. The same applies to FIGS. 4 and 5 described later.

In Example 1, since Si in the raw material powder is not consumed in the generation of β-SiC and NiSi$_2$ and 10 mass % or more of Si is left in the honeycomb structure 2, the volume resistivity of the honeycomb structure 2 is reduced and the oxidation resistance thereof is increased, as described above. Further, since the maximum particle diameter of β-SiC particles is 15 μm or more, the binding portion of the β-SiC particles forming the conductive path becomes thicker, and the volume resistivity of the honeycomb structure 2 is further reduced and the oxidation resistance thereof is further increased. Further, since the content and the maximum particle diameter of the Si particles are 10 mass % or higher and 40 μm or smaller, respectively, the uniformity of distribution of the Si particles is increased and the conductive path for connecting the β-SiC particles is formed by the Si particles distributed almost uniformly. It is thereby possible to further reduce the volume resistivity of the honeycomb structure 2 and further increase the oxidation resistance thereof. Furthermore, since the oxide coating film (i.e., the coating film of SiO$_2$) having a thickness not smaller than 0.01 μm and not larger than 5 μm is formed in advance on the surfaces of the Si particles, the oxidation resistance of the honeycomb structure 2 is further increased. Specifically, in Example 1, the initial resistivity of the honeycomb structure 2 is low, specifically 0.10 Ω·cm and the resistance change rate is low, specifically 10%.

In Example 2, the manufacturing conditions of the honeycomb structure 2 are the same as those in Example 1 except that Al serving as the aid is added by 1 part by mass with respect to 100 parts by mass of the main raw material (i.e., Si, C, and Ni). The constitution of the honeycomb structure 2 includes the same constituents as those of Example 1 (i.e., β-SiC, Si, NiSi$_2$, and SiO$_2$ which is the oxide coating film) and Al$_2$O$_3$ which is not shown in Tables but is added. The film thickness of SiO$_2$ is 0.4 μm. The content and the maximum particle diameter of Si are 13 mass % and 35 μm, respectively. The content and the maximum particle diameter of β-SiC are 70 mass % and 26 μm, respectively. The content and the maximum particle diameter of NiSi$_2$ are 14 mass % and 15 μm, respectively. In Example 2, the initial resistivity of the honeycomb structure 2 is low, specifically 0.15 Ω·cm and the resistance change rate is low, specifically 20%.

In Example 3, the manufacturing conditions of the honeycomb structure 2 are the same as those in Example 2 except that the addition amount of Al serving as the aid is changed to 2 parts by mass. The constitution of the honeycomb structure 2 is the same as that of Example 2. The film thickness of SiO$_2$ is 0.3 μm. The content and the maximum particle diameter of Si are 13 mass % and 32 μm, respectively. The content and the maximum particle diameter of β-SiC are 70 mass % and 28 μm, respectively. The content and the maximum particle diameter of NiSi$_2$ are 14 mass % and 12 μm, respectively. In Example 3, the initial resistivity of the honeycomb structure 2 is low, specifically 0.12 Ω·cm and the resistance change rate is low, specifically 20%.

In Example 4, the manufacturing conditions of the honeycomb structure 2 are the same as those in Example 2 except that the addition amount of Al serving as the aid is changed to 5 parts by mass. The constitution of the honeycomb structure 2 is the same as that of Example 2. The film thickness of $SiO_2$ is 0.1 μm. The content and the maximum particle diameter of Si are 12 mass % and 30 μm, respectively. The content and the maximum particle diameter of β-SiC are 68 mass % and 33 μm, respectively. The content and the maximum particle diameter of $NiSi_2$ are 14 mass % and 9 μm, respectively. In Example 4, the initial resistivity of the honeycomb structure 2 is low, specifically 0.20 Ω·cm and the resistance change rate is low, specifically 30%.

In Example 5, the manufacturing conditions of the honeycomb structure 2 are the same as those in Example 4 except that the respective contents of Si, C, and Ni which are main raw materials are 74.5 mass %, 17.7 mass %, and 7.8 mass %. The constitution of the honeycomb structure 2 is the same as that of Example 4. The film thickness of $SiO_2$ is 0.05 μm. The content and the maximum particle diameter of Si are 24 mass % and 38 μm, respectively. The content and the maximum particle diameter of β-SiC are 56 mass % and 30 μm, respectively. The content and the maximum particle diameter of $NiSi_2$ are 14 mass % and 15 μm, respectively. In Example 5, the initial resistivity of the honeycomb structure 2 is low, specifically 0.08 Ω·cm and the resistance change rate is low, specifically 50%.

In Example 6, the manufacturing conditions of the honeycomb structure 2 are the same as those in Example 5 except that no aid is added. The constitution of the honeycomb structure 2 is the same as that of Example 5. The film thickness of $SiO_2$ is 0.3 μm. The content and the maximum particle diameter of Si are 26 mass % and 15 μm, respectively. The content and the maximum particle diameter of β-SiC are 56 mass % and 17 μm, respectively. The content and the maximum particle diameter of $NiSi_2$ are 16 mass % and 10 μm, respectively. In Example 6, the initial resistivity of the honeycomb structure 2 is low, specifically 0.12 Ω·cm and the resistance change rate is low, specifically 50%.

In Example 7, the manufacturing conditions of the honeycomb structure 2 are the same as those in Example 1 except that B serving as the aid is added by 0.5 parts by mass with respect to 100 parts by mass of the main raw material (i.e., Si, C, and Ni). The constitution of the honeycomb structure 2 includes the same constituents as those of Example 1 (i.e., β-SiC, Si, $NiSi_2$, and $SiO_2$ which is the oxide coating film) and $B_2O_3$ which is not shown in Tables but is added. The film thickness of $SiO_2$ is 1.0 μm. The content and the maximum particle diameter of Si are 12 mass % and 35 μm, respectively. The content and the maximum particle diameter of β-SiC are 71 mass % and 25 μm, respectively. The content and the maximum particle diameter of $NiSi_2$ are 14 mass % and 15 μm, respectively. In Example 7, the initial resistivity of the honeycomb structure 2 is low, specifically 0.52 Ω·cm and the resistance change rate is low, specifically 80%.

In Comparative Example 1, the manufacturing conditions of the honeycomb structure are the same as those in Example 1 except that the average particle diameter of Ni is 35 μm. The constitution of the honeycomb structure is the same as that of Example 1. The film thickness of $SiO_2$ is 0.5 μm. The content of Si is 13 mass %. The maximum particle diameter of Si is large, specifically 50 μm (i.e., larger than 40 μm). The content of β-SiC is 72 mass %. The maximum particle diameter of β-SiC is small, specifically 10 μm (i.e., smaller than 15 μm). The content of $NiSi_2$ is 13 mass %. The maximum particle diameter of $NiSi_2$ is large, specifically 22 μm (i.e., larger than 20 μm).

Figure 4:
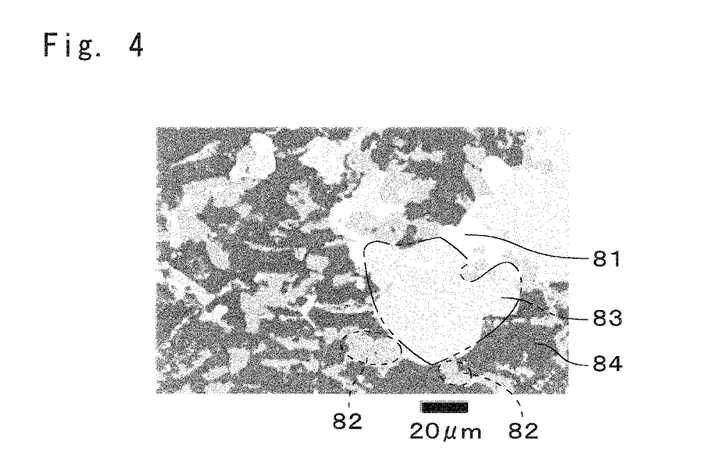
FIG. 4 is a SEM image of a honeycomb structure in one Comparative Example.

FIG. 4 is a SEM image showing a polished cross section of the honeycomb structure in Comparative Example 1. In Comparative Example 1, since the Si particles whose maximum particle diameter is larger than 40 μm are unevenly distributed, binding of the β-SiC particles is inhibited. Further, since the maximum particle diameter of the β-SIC particles is small, specifically 15 μm or smaller, the conductive path in the binding portion of the β-SiC particles is narrow. For this reason, when the binding portions of the Si particles and the β-SiC particles are oxidized, the conductive path is blocked and the volume resistivity is significantly increased. Therefore, the oxidation resistance of the honeycomb structure becomes lower. Further, in Comparative Example 1, since $NiSi_2$ particles whose maximum particle diameter is larger than 20 μm are unevenly distributed, it is thought that there are many portions in which the grain growth of the n-SiC particles is not promoted by Ni. Therefore, the oxidation resistance of the honeycomb structure is further reduced. Specifically, in Comparative Example 1, the initial resistivity of the honeycomb structure is 0.15 Ω·cm and the resistance change rate thereof is high, specifically 150% (i.e., higher than 100%).

In Comparative Example 2, the manufacturing conditions of the honeycomb structure are the same as those in Example 1 except that the contents of Si, C, and Ni are changed to 68.5 mass %, 24.4 mass %, and 7.2 mass %, respectively, and the average particle diameter of Ni is changed to 0.5 μm. The constitution of the honeycomb structure is the same as that of Example 1. The film thickness of $SiO_2$ is 0.5 μm. The content of Si is low, specifically 5 mass % (i.e., lower than 10 mass %). The maximum particle diameter of Si is 5 μm. The content of β-SiC is 87 mass %. The maximum particle diameter of β-SiC is small, specifically 5 μm (i.e., smaller than 15 μm). The content and the maximum particle diameter of $NiSi_2$ are 7 mass % and 5 μm, respectively.

Figure 5:
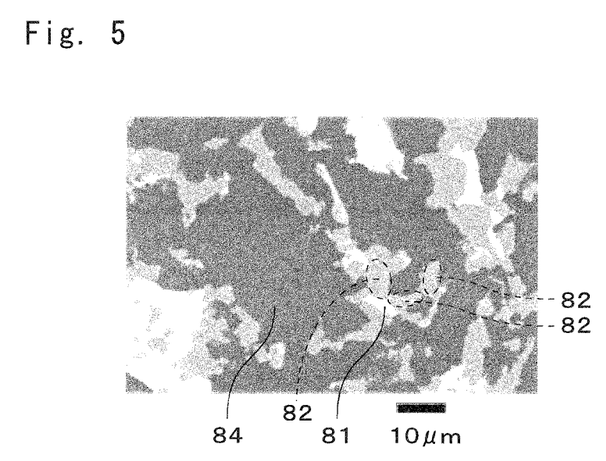
FIG. 5 is a SEM image of a honeycomb structure in another Comparative Example.

FIG. 5 is a SEM image showing a polished cross section of the honeycomb structure in Comparative Example 2. In Comparative Example 2, since the content of the Si particles is low, specifically lower than 10 mass %, there are a few conductive paths or substantially no conductive path, each of which is formed of the Si particles for connecting the β-SiC particles. Further, since the maximum particle diameter of the β-SiC particles is small, specifically smaller than 15 μm, the conductive path in the binding portion of the β-SiC particles is narrow. For this reason, the volume resistivity of the honeycomb structure is relatively high, and the oxidation resistance thereof is significantly reduced. Specifically, in Comparative Example 2, the initial resistivity of the honeycomb structure is 0.64 Ω·cm and the resistance change rate thereof is high, specifically 440% (i.e., higher than 100%).

In Comparative Example 3, the manufacturing conditions of the honeycomb structure are the same as those in Example 2 except that the average particle diameter of Ni is 35 μm. The constitution of the honeycomb structure is the same as that of Example 2. The film thickness of $SiO_2$ is 0.5 μm. The content and the maximum particle diameter of Si are 12 mass % and 35 μm, respectively. The content of β-SiC is 71 mass %. The maximum particle diameter of β-sic is small, specifically 10 μm (i.e., smaller than 15 μm). The content of $NiSi_2$ is 14 mass %. The maximum particle diameter of $NiSi_2$ is large, specifically 25 μm (i.e., larger than 20 μm). In Comparative Example 3, since the $NiSi_2$ particles whose maximum particle diameter is larger than 20 μm are unevenly distributed, it is thought that there are many portions in which the grain growth of the β-SiC particles by Ni is not promoted. Therefore, the oxidation resistance of the honeycomb structure is reduced. Specifically, in Comparative Example 3, the initial resistivity of the honeycomb structure is 0.05 Ω·cm and the resistance change rate thereof is high, specifically 150% (i.e., higher than 100%).

In Comparative Example 4, the manufacturing conditions of the honeycomb structure are the same as those in Example 4 except that the pre-oxidation treatment in above-described Step S13 is omitted. The constitution of the honeycomb structure is the same as that of Example 4 except that no oxide coating film is formed on the surfaces of the Si particles. In Comparative Example 4, the content and the maximum particle diameter of Si are 12 mass % and 30 μm, respectively. The content and the maximum particle diameter of n-SiC are 68 mass % and 33 μm, respectively. The content and the maximum particle diameter of $NiSi_2$ are 14 mass % and 10 μm, respectively. In Comparative Example 4, the initial resistivity of the honeycomb structure is 0.15 Ω·cm. Further, the resistance change rate of the honeycomb structure is high, specifically 220% (i.e., higher than 100%) since no oxide coating film is formed.

As described above, the silicon carbide porous body contains β-SiC particles, Si particles, and metal silicide particles. The maximum particle diameter of the β-sic particles is not smaller than 15 μm. The content of the Si particles is not lower than 10 mass %. The maximum particle diameter of the Si particles is not larger than 40 μm. Further, the oxide coating film having a thickness not smaller than 0.01 μm and not larger than 5 μm is provided on surfaces of the Si particles.

In the silicon carbide porous body, since the maximum particle diameter of the Si particles is not smaller than 15 μm, being coarsened, the binding portion of β-SiC particles, which forms the conductive path, becomes thick. Further, since Si in the raw material powder is not exhausted and 10 mass % or more of Si particles are left, the conductive path of the Si particles for connecting the β-SiC particles is suitably formed. Furthermore, since the content and the maximum particle diameter of the Si particles are not lower than 10 mass % and not larger than 40 μm, respectively, the uniformity of distribution of the Si particles is increased, and the conductive paths each of the Si particles for connecting the β-SiC particles are distributed almost uniformly. The volume resistivity of the honeycomb structure 2 thereby becomes lower and the oxidation resistance is increased. Further, since the oxide coating film (coating film of $SiO_2$ in the above-described exemplary case) having a thickness not smaller than 0.01 μm and not larger than 5 μm is provided on the surfaces of the Si particles, the oxidation resistance of the honeycomb structure 2 is further increased. Therefore, it is possible to provide a silicon carbide porous body having high oxidation resistance (in other words, in which the resistance change rate is low after the exposure to the high temperature oxidation atmosphere).

As described above, in the silicon carbide porous body, it is preferable that the content of the metal silicide particles should be not lower than 5 mass %, and the maximum particle diameter of the metal silicide particle should be not larger than 20 μm. The uniformity of distribution of the metal silicide particles in the silicon carbide porous body is thereby increased. In other words, in the manufacture of the silicon carbide porous body, the grain growth (i.e., coarsening) of the β-SiC particles is promoted by the metal forming the metal silicide particles, in almost the whole of the silicon carbide porous body. As a result, it is possible to further reduce the volume resistivity of the silicon carbide porous body and further increase the oxidation resistance of the silicon carbide porous body.

As described above, it is preferable that the silicon carbide porous body should further contain one or more kinds of Al and B. Thus, by adding one or more kinds of Al and B as the aid in the manufacture of the silicon carbide porous body, it is possible to further promote the grain growth of the β-SiC particles.

As described above, it is preferable that the metal silicide particle should be nickel silicide. It is thereby possible to more suitably promote the grain growth of the β-SiC particles in the manufacture of the silicon carbide porous body.

As described above, it is preferable that the volume resistivity of the silicon carbide porous body at a room temperature should be not lower than 0.01 Ω·cm and lower than 1.0 Ω·cm. Thus, in the silicon carbide porous body, it is possible to achieve much lower volume resistivity.

As described above, in the silicon carbide porous body, it is preferable that the change rate of the volume resistivity after exposing the silicon carbide porous body to an atmosphere at 950° C. for 50 hours should be not higher than 100%. It is thereby possible to provide a silicon carbide porous body having higher oxidation resistance.

The above-described honeycomb structure 2 includes the cylindrical outer wall 21 and the partition wall 22. The partition wall 22 partitions the inside of the cylindrical outer wall 21 into the plurality of cells 23. The cylindrical outer wall 21 and the partition wall 22 are formed, including the above-described silicon carbide porous body. It is thereby possible to achieve the honeycomb structure 2 having high oxidation resistance.

The above-described electrically heated catalyst 1 is used to perform the purification treatment of exhaust gas discharged from an engine. The electrically heated catalyst 1 includes the above-described honeycomb structure 2 and the pair of electrode parts 41 fixed to the outer surface of the honeycomb structure 2, for giving a current to the honeycomb structure 2. As described above, since the honeycomb structure 2 has high oxidation resistance, it is possible to perform the purification treatment of exhaust gas by using the electrically heated catalyst 1 with high efficiency for long time period.

The above-described method of manufacturing a silicon carbide porous body includes a step (Steps S11 to S12) of obtaining a sintered body by molding and sintering (firing) raw material powder containing raw material metals such as Si, C, and metal silicide and a step (Step S13) of obtaining a silicon carbide porous body by performing an oxidation treatment on the sintered body. The silicon carbide porous body contains β-SiC particles, Si particles, and metal silicide particles. The maximum particle diameter of the β-sic particles is not smaller than 15 μm. The content of the Si particles is not lower than 10 mass %. The maximum particle diameter of the Si particles is not larger than 40 μm. Further, an oxide coating film having a thickness not smaller than 0.01 μm and not larger than 5 μm is provided on surfaces of the Si particles. It is thereby possible to provide a silicon carbide porous body having high oxidation resistance, as described above.

As described above, in the method of manufacturing a silicon carbide porous body, it is preferable that the raw material metal should be Ni and the average particle diameter of the raw material metal should be not larger than 5 μm. In the manufacture of the silicon carbide porous body, the uniformity of dispersion of the raw material metals is thereby increased, and in almost the whole of the silicon carbide porous body, with the raw material metal, the grain growth (i.e., coarsening) of the β-SiC particles is promoted. As a result, it is possible to further reduce the volume resistivity of the silicon carbide porous body and further increase the oxidation resistance of the silicon carbide porous body.

In the silicon carbide porous body, the honeycomb structure 2, and the electrically heated catalyst 1 which are described above, various modifications can be made.

For example, the content of the metal silicide particles in the silicon carbide porous body may be lower than 5 mass %, and the maximum particle diameter of the metal silicide particles may be larger than 20 μm.

Further, the silicon carbide porous body may contain both Al and B, or may contain neither Al nor B.

The volume resistivity of the silicon carbide porous body at a room temperature may be lower than 0.01 Ω·cm or may be higher than 1.0 Ω·cm. Further, the resistance change rate (i.e., the change rate of the volume resistivity after exposing the silicon carbide porous body to the atmosphere at 950° C. for 50 hours) may be higher than 100% or may be lower than −50%.

In the above-described method of manufacturing the silicon carbide porous body, the average particle diameter of Ni which is a raw material metal of metal silicide may be larger than 5 μm. Further, as described above, the raw material metal is not limited to Ni, but may be zirconium (Zr), iron (Fe), titanium (Ti), tungsten (W), or the like.

In the electrically heated catalyst 1, the outer shape of the honeycomb structure 2 is not limited to the substantially columnar shape but may be changed into any one of various shapes. Further, the respective numbers of and the arrangement of the electrode layers 31 and the electrode parts 41 may be variously changed. Furthermore, in the electrically heated catalyst 1, the electrode layer 31 may be omitted and the electrode part 41 may be directly fixed to the honeycomb structure 2.

The honeycomb structure 2 may be used for any use (e.g., a ceramic heater) other than the electrically heated catalyst.

The above-described silicon carbide porous body may be used for any structure other than the honeycomb structure 2. For example, a structure having any one of various shapes, such as a substantially cylindrical shape, a substantially flat plate-like shape, or the like, may be formed, including the silicon carbide porous body.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The present invention can be used for the electrically heated catalyst or the like which is used for the purification treatment of exhaust gas from an engine of an automobile or the like.

REFERENCE SIGNS LIST

1 Electrically heated catalyst
2 Honeycomb structure
21 Cylindrical outer wall
22 Partition wall
41 Electrode part
S11 to S13 Step

The invention claimed is:

1. A silicon carbide porous body, containing:
   β-SiC particles;
   Si particles; and
   metal silicide particles,
   wherein the maximum particle diameter of said β-SiC particles is not smaller than 15 μm,
   the content of said Si particles is not lower than 10 mass %,
   the maximum particle diameter of said Si particles is not larger than 40 μm, and
   an oxide coating film having a thickness not smaller than 0.01 μm and not larger than 5 μm is provided on surfaces of said Si particles.

2. The silicon carbide porous body according to claim 1, wherein
   the content of said metal silicide particles is not lower than 5 mass %, and
   the maximum particle diameter of said metal silicide particles is not larger than 20 μm.

3. The silicon carbide porous body according to claim 1, further containing:
   one or more kinds of Al and B.

4. The silicon carbide porous body according to claim 1, wherein
   said metal silicide particles are nickel silicide.

5. The silicon carbide porous body according to claim 1, wherein
   the volume resistivity thereof at a room temperature is not lower than 0.01 Ω·cm and lower than 1.0 Ω·cm.

6. The silicon carbide porous body according to claim 1, wherein
   the change rate of the volume resistivity thereof after exposing the silicon carbide porous body to an atmosphere at 950° C. for 50 hours is not higher than 100%.

7. A honeycomb structure, comprising:
   a cylindrical outer wall; and
   a partition wall partitioning the inside of said cylindrical outer wall into a plurality of cells,
   wherein said cylindrical outer wall and said partition wall are provided including said silicon carbide porous body according to claim 1.

8. An electrically heated catalyst used for performing a purification treatment of exhaust gas discharged from an engine, comprising:
   said honeycomb structure according to claim 7; and
   a pair of electrode parts fixed to an outer surface of said honeycomb structure, for giving a current to said honeycomb structure.

9. A method of manufacturing a silicon carbide porous body, comprising:
   obtaining a sintered body by molding and sintering raw material powder containing raw material metals such as Si, C, and metal silicide; and
   obtaining a silicon carbide porous body by performing an oxidation treatment on said sintered body,
   wherein said silicon carbide porous body contains
   β-SiC particles;
   Si particles; and
   metal silicide particles,
   and wherein the maximum particle diameter of said n-SiC particles is not smaller than 15 μm,
   the content of said Si particles is not lower than 10 mass %, the maximum particle diameter of said Si particles is not larger than 40 μm, and an oxide coating film having a thickness not smaller than 0.01 μm and not larger than 5 μm is provided on surfaces of said Si particles.

10. The method of manufacturing a silicon carbide porous body according to claim 9, wherein said raw material metal is Ni, and the average particle diameter of said raw material metal is not larger than 5 μm.

* * * * *